(12) United States Patent
Jiang et al.

(10) Patent No.: US 11,835,682 B1
(45) Date of Patent: Dec. 5, 2023

(54) TOUCH PANEL MODULE

(71) Applicant: TPK Touch Solutions (Xiamen) Inc., Fujian (CN)

(72) Inventors: Yau Cheng Jiang, Hsinchu County (TW); Ren Yuan Yan, Yongtai County (CN); Jia Jing Chen, Xiamen (CN)

(73) Assignee: TPK TOUCH SOLUTIONS (XIAMEN) INC., Fujian (CN)

( * ) Notice: Subject to any disclaimer, the term of this patent is extended or adjusted under 35 U.S.C. 154(b) by 0 days.

(21) Appl. No.: 18/302,881

(22) Filed: Apr. 19, 2023

(51) Int. Cl.
*G06F 3/041* (2006.01)
*B32B 7/12* (2006.01)
*G02B 1/14* (2015.01)
*G02B 5/30* (2006.01)

(52) U.S. Cl.
CPC .............. *G02B 1/14* (2015.01); *G02B 5/3033* (2013.01); *G06F 3/041* (2013.01)

(58) Field of Classification Search
CPC ........ G02B 1/14; G02B 5/3033; B32B 27/08; B32B 27/308; B32B 27/325; B32B 27/42; B32B 7/12; B32B 27/40; B32B 7/022; B32B 2457/208; B32B 2307/412; B32B 17/10; B32B 2307/414; G06F 3/041; G06F 3/0445; G06F 2203/04103
See application file for complete search history.

(56) References Cited

U.S. PATENT DOCUMENTS

| 11,656,495 B2 * | 5/2023 | Yang .................. G02F 1/133385 349/96 |
| 11,656,698 B1 * | 5/2023 | Takahashi ............... B32B 27/08 345/173 |

* cited by examiner

*Primary Examiner* — Deeprose Subedi
(74) *Attorney, Agent, or Firm* — Cooper Legal Group, LLC

(57) ABSTRACT

A touch panel module includes a display panel, a polarizing film, a first optical clear adhesive layer, a transparent touch layer, a second optical clear adhesive layer, and a protective layer that are sequentially stacked on the display panel, and a sealing adhesive layer. The first optical clear adhesive layer extends outward from an edge of the polarizing film to form a gap with the display panel. The sealing adhesive layer is formed between the display panel and the protective layer, completely covers sidewalls of the polarizing film, the first optical clear adhesive layer, the transparent touch layer, and the second optical clear adhesive layer on the same side, and fills the gap. After undergoing a temperature shock test, a number of air bubbles with a size larger than 0.1 mm per square centimeter of the touch panel module is less than 1.

10 Claims, 2 Drawing Sheets

TOUCH PANEL MODULE

BACKGROUND

Technical Field

The present disclosure relates to a touch panel module.

Description of Related Art

Currently, there are many electronic products (e.g., laptops) on the market that pass military-spec tests to ensure that they can withstand extreme environments that are harsher than typical environments (e.g., classrooms, offices, and etc.). However, especially after high and low temperature shock tests, it is easy to cause functional failure of products or parts. For example, bubbles can be observed at the edges of the display screen.

Accordingly, how to provide a touch panel module to solve the aforementioned problems becomes an important issue to be solved by those in the industry.

SUMMARY

An aspect of the disclosure is to provide a touch panel module that can efficiently solve the aforementioned problems.

According to an embodiment of the disclosure, a touch panel module includes a display panel, a polarizing film, a first optical clear adhesive layer, a transparent touch layer, a second optical clear adhesive layer, a protective layer, and a sealing adhesive layer. The polarizing film is disposed on the display panel. The first optical clear adhesive layer is disposed on the polarizing film and extends outward from an edge of the polarizing film to form a gap with the display panel. The transparent touch layer is disposed on the first optical clear adhesive layer. The second optical clear adhesive layer is disposed on the transparent touch layer. The protective layer is disposed on the transparent touch layer and forms an appearance surface of the touch panel module. The sealing adhesive layer is formed between the display panel and the protective layer, completely covers sidewalls respectively of the polarizing film, the first optical clear adhesive layer, the transparent touch layer, and the second optical clear adhesive layer on a same side, and fills the gap. After undergoing a temperature shock test with three cycles between −51° C. and 96° C. and dwell times of upper and lower limits of temperature being 30 minutes or after undergoing a temperature shock test with three cycles between −51° C. and 71° C. and dwell times of upper and lower limits of temperature being 4 hours, a number of air bubbles with a size larger than 0.1 mm per square centimeter of the touch panel module is less than 1.

In an embodiment of the disclosure, a water vapor permeability of the sealing adhesive layer is in a range from 1.4 g/m$^2$·24 h to 3 g/m$^2$·24 h.

In an embodiment of the disclosure, a moisture content of the sealing adhesive layer is greater than a moisture content of the first optical clear adhesive layer by at least 0.05 wt %.

In an embodiment of the disclosure, wherein a moisture content of the sealing adhesive layer is in a range from 0.5 wt % to 1.5 wt %.

In an embodiment of the disclosure, a water vapor permeability of the first optical clear adhesive layer is in a range from 80 g/m$^2$·24 h to 100 g/m$^2$·24 h. A moisture content of the first optical clear adhesive layer is 0.45 wt %.

In an embodiment of the disclosure, a viscosity of the first optical clear adhesive layer at −51° C. or 96° C. is at least 12 Pa·s.

In an embodiment of the disclosure, the first optical clear adhesive layer has a peeling force of at least 2.0 kgf at −51° C. or 96° C.

In an embodiment of the disclosure, the sealing adhesive layer has an inner side surface and an outer side surface. The inner side surface is in contact with the sidewalls of the polarizing film, the first optical clear adhesive layer, the transparent touch layer, and the second optical clear adhesive layer. The outer side surface is connected to the display panel and the protective layer. In a direction perpendicular to one of the sidewalls, a maximum distance between the inner side surface and the outer side surface is in a range from 4 mm to 6 mm.

In an embodiment of the disclosure, the inner side surface is completely and seamlessly in contact with the sidewalls of the polarizing film, the first optical clear adhesive layer, the transparent touch layer, and the second optical clear adhesive layer. The sealing adhesive layer further has an upper side surface and a lower side surface. The lower side surface is seamlessly in contact with a top surface of the display panel. The upper side surface is seamlessly in contact with a bottom surface of the protective layer.

In an embodiment of the disclosure, the sealing adhesive layer includes at least one of high temperature curing glue, organic silicon glue, polyurethane glue, or polysulfide glue.

Accordingly, in the touch panel module of the present disclosure, by using the sealing adhesive layer to completely cover the sidewalls of the polarizing film, the first optical clear adhesive layer, the transparent touch layer, and the second optical clear adhesive layer on the same side between the display panel and the protective layer and fill the gap between the first optical clear adhesive layer and the display panel, air bubbles can be prevented from being generated at the interface between the polarizing film and the first optical clear adhesive layer during the bonding process. In this way, the touch panel module of the present disclosure can have a number of air bubbles with a size larger than 0.1 mm per square centimeter less than 1 after undergoing the temperature shock test with three cycles between −51° C. and 96° C. and dwell times of upper and lower limits of temperature being 30 minutes or after undergoing the temperature shock test with three cycles between −51° C. and 71° C. and dwell times of upper and lower limits of temperature being 4 hours.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
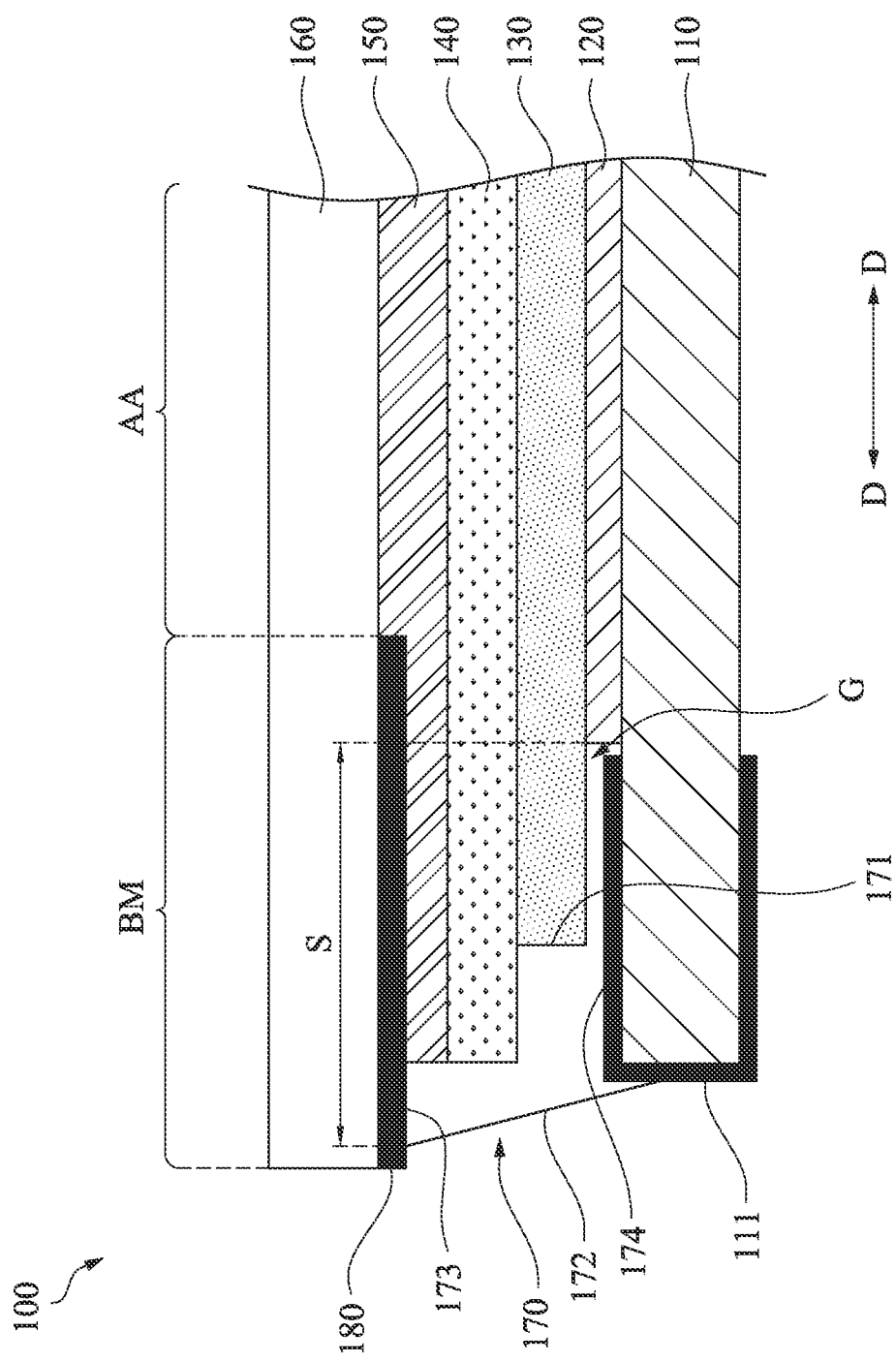
FIG. 1 is a partial schematic diagram of a touch panel module according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a partial schematic diagram of a touch panel module 100 according to an embodiment of the present disclosure. As shown in FIG. 1, in the present disclosure, a touch panel module 100 includes a display panel 110, a polarizing film 120, a first optical clear adhesive layer 130, a transparent touch layer 140, a second optical clear adhesive layer 150, a protective layer 160, and a sealing adhesive layer 170. The polarizing film 120 is disposed on the display panel 110. The first optical clear adhesive layer 130 is disposed on the polarizing film 120 and extends outward from an edge of the polarizing film 120 to form a gap G with the display panel 110. The display panel 110 includes a cell tape 111 covering an edge thereof. The cell tape 111 extends into the gap G.

As shown in FIG. 1, in the present disclosure, the transparent touch layer 140 is disposed on the first optical clear adhesive layer 130. The second optical clear adhesive layer 150 is disposed on the transparent touch layer 140. The protective layer 160 is disposed on the transparent touch layer 140 and forms an appearance surface of the touch panel module 100. That is, the protective layer 160 is the outermost component of the touch panel module 100.

In some embodiments, a material of the protective layer 160 includes glass, but the present disclosure is not limited in this regard.

In some embodiments, the transparent touch layer 140 may be composed of a silver nanowire (SNW; also known as AgNW) electrode layer, a metal grid, or an electrode layer containing indium tin oxide (ITO), but the present disclosure is not limited in this regard.

As shown in FIG. 1, in the present disclosure, the sealing adhesive layer 170 is formed between the display panel 110 and the protective layer 160, completely covers sidewalls respectively of the polarizing film 120, the first optical clear adhesive layer 130, the transparent touch layer 140, and the second optical clear adhesive layer 150 on a same side, and fills the gap G between the display panel 110 and the first optical clear adhesive layer 130.

In detail, as shown in FIG. 1, the sealing adhesive layer 170 has an inner side surface 171 and an outer side surface 172. The inner side surface 171 is completely and seamlessly in contact with the sidewalls of the polarizing film 120, the first optical clear adhesive layer 130, the transparent touch layer 140, and the second optical clear adhesive layer 150. The outer side surface 172 is connected to the display panel 110 and the protective layer 160. The sealing adhesive layer 170 further has an upper side surface 173 and a lower side surface 174. The lower side surface 174 is seamlessly in contact with a top surface of the display panel 110. The upper side surface 173 is seamlessly in contact with a bottom surface of the protective layer 160.

With the aforementioned structural configurations, the sealing adhesive layer 170 can prevent air from reaching the gap G between the display panel 110 and the first optical clear adhesive layer 130 from the side of the touch panel module 100 during the bonding process of the touch panel module 100, so as to prevent air bubbles from being generated at the interface between the polarizing film 120 and the first optical clear adhesive layer 130. In this way, the touch panel module 100 of the present embodiment can have a number of air bubbles with a size larger than 0.1 mm per square centimeter less than 1 after undergoing the temperature shock test with three cycles between −51° C. and 96° C. and dwell times of upper and lower limits of temperature being 30 minutes or after undergoing the temperature shock test with three cycles between −51° C. and 71° C. and dwell times of upper and lower limits of temperature being 4 hours.

As shown in FIG. 1, in the present embodiment, a light-shielding layer 180 is on a side of the protective layer 160 close to the display panel 110. The light-shielding layer 180 is located on an edge of the protective layer 160. The light-shielding layer 180 can define a visible area AA and a light-shielding area BM of the touch panel module 100. Specifically, when viewing the display panel 110 from the side of the protective layer 160, the vertical projection area of the light-shielding layer 180 can be defined as the light-shielding area BM, and the area outside the vertical projection area of the light-shielding layer 180 can be defined as the visible area AA.

In some embodiments, the aforementioned 0.1 mm refers to the diameter of the air bubbles observed in the visible area AA when viewing the display panel 110 from the side of the protective layer 160.

As shown in FIG. 1, in the present embodiment, in a direction D perpendicular to one of the sidewalls, a maximum distance S between the inner side surface 171 and the outer side surface 172 is in a range from about 4 mm to about 6 mm. By making the maximum distance S greater than about 4 mm, the distance for the air to reach the gap G between the display panel 110 and the first optical clear adhesive layer 130 via the sealing adhesive layer 170 can be long enough, so as to more effectively avoid bubbles from being generated at the interface between the polarizing film 120 and the first optical clear adhesive layer 130.

Figure 2:
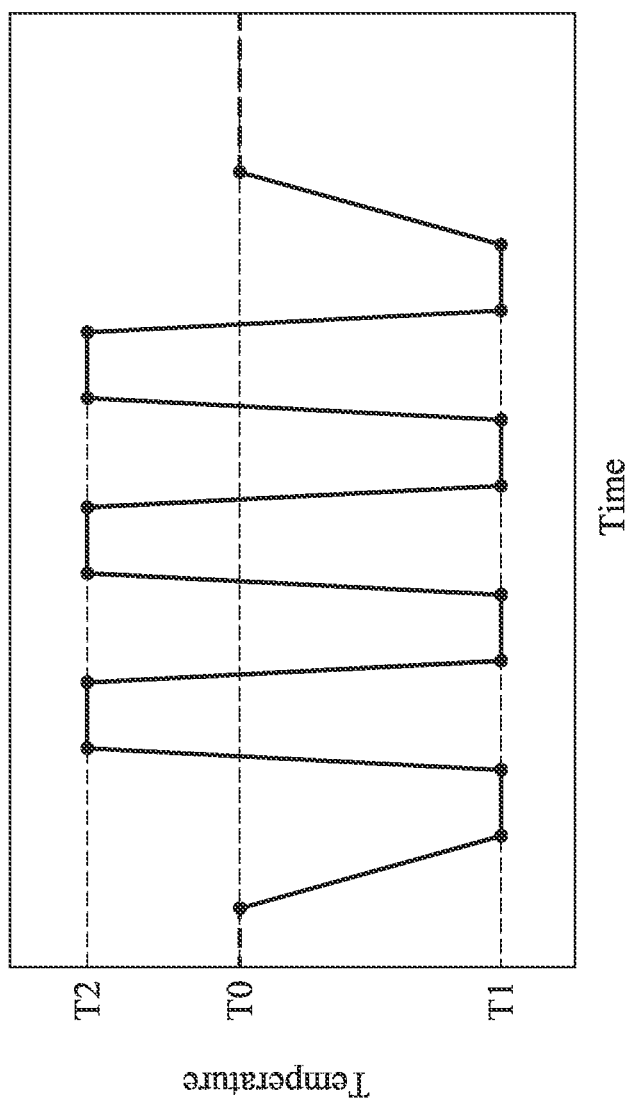
FIG. 2 is a time-temperature graph illustrating a temperature shock test according to an embodiment of the present disclosure.

Reference is made to FIG. 2. FIG. 2 is a time-temperature graph illustrating a temperature shock test according to an embodiment of the present disclosure. As shown in FIG. 2, in the present embodiment, if heating from temperature T1 to temperature T2 and then cooling to temperature T1 constitutes a high and low temperature cycle, then the time-temperature graph in FIG. 2 has three high and low temperature cycles.

In some embodiments, temperature T0 is room temperature (e.g., 20° C.), temperature T1 is −51° C., and temperature T2 is 96° C. or 71° C., but the present disclosure is not limited in this regard.

As shown in FIG. 2, the temperature shock test will go through four times of the lower limit of temperature (i.e., temperature T1) and three times of the upper limit of temperature (i.e., temperature T2). In some embodiments, dwell times of the upper and lower limits of temperature are 30 minutes, but the present disclosure is not limited in this regard. In some other embodiments, the dwell times of the upper and lower limits of temperature are 4 hours, but the present disclosure is not limited in this regard.

In some embodiments, as shown in FIG. 2, the ramp rate of temperature from temperature T0 to temperature T1 at the beginning is less than 3° C./Min, but the present disclosure is not limited in this regard.

In some embodiments, as shown in FIG. 2, the ramp rate of temperature from temperature T1 to temperature T0 at the end is less than 3° C./Min, but the present disclosure is not limited in this regard.

In some embodiments, as shown in FIG. 2, the time required to heat up from temperature T1 to temperature T2 and the time required to cool down from temperature T2 to temperature T1 is less than 1 minute, but the present disclosure is not limited in this regard.

In some embodiments, a water vapor permeability of the sealing adhesive layer 170 is in a range from about 1.4 g/m$^2$·24 h to about 3 g/m$^2$·24 h.

In some embodiments, a water vapor permeability of the first optical clear adhesive layer 130 is in a range from about 80 g/m$^2$·24 h to about 100 g/m$^2$·24 h. A moisture content of the first optical clear adhesive layer 130 is about 0.45 wt %.

In some embodiments, a moisture content of the sealing adhesive layer 170 is greater than the moisture content of the first optical clear adhesive layer 130 by at least about 0.05 wt %.

In some embodiments, the moisture content of the sealing adhesive layer 170 is in a range from about 0.5 wt % to about 1.5 wt %.

When the physical parameters of the sealing adhesive layer 170 and the first optical clear adhesive layer 130 meet the above conditions, the touch panel module 100 can achieve the aforementioned purpose of preventing air bubbles from being generated at the interface between the polarizing film 120 and the first optical clear adhesive layer 130 after undergoing the temperature shock test. In order to verify the above statement, the Applicant provides temperature shock tests as shown in FIG. 2, which are performed with different combinations of the sealing adhesive layer 170 and the first optical clear adhesive layer 130.

The following Table 1 is a table of physical parameters of the sealing adhesive layer 170 of the embodiments A-C.

TABLE 1

|  | Embodiment A | Embodiment B | Embodiment C |
|---|---|---|---|
| Moisture content (wt %) | 0.5 | 1.5 | 0.6 |
| Water vapor permeability (g/m$^2$ · 24 h) | 1.41 | 2.88 | 1.50 |

The following Table 2 is a table of physical parameters of the first optical clear adhesive layer 130 of the embodiments a-c.

TABLE 2

|  | Embodiment a | Embodiment b | Embodiment c |
|---|---|---|---|
| Moisture content (wt %) | 0.45 | 0.45 | 0.45 |
| Water vapor permeability (g/m$^2$ · 24 h) | 100 | 80 | 96.4 |

The following Table 3 shows the results of the temperature shock tests for the different combinations of the sealing adhesive layer 170 and the first optical clear adhesive layer 130.

TABLE 3

| Sealing adhesive layer | First optical clear adhesive layer | Result |
|---|---|---|
| Embodiment A | Embodiment a | Pass |
| Embodiment A | Embodiment b | Pass |
| Embodiment A | Embodiment c | Pass |
| Embodiment B | Embodiment a | Fail |
| Embodiment B | Embodiment b | Pass |
| Embodiment B | Embodiment c | Fail |
| Embodiment C | Embodiment a | Fail |
| Embodiment C | Embodiment b | Pass |
| Embodiment C | Embodiment c | Fail |

From the results presented in the Table 3, the combinations of the sealing adhesive layer 170 and the first optical clear adhesive layer 130 that pass the temperature shock test shown in FIG. 2 indeed meet the aforementioned conditions of the physical parameters of the sealing adhesive layer 170 and the first optical clear adhesive layer 130.

In some embodiments, a viscosity of the first optical clear adhesive layer 130 at −51° C. or 96° C. is at least 12 Pas, and preferably 15 Pas. If the viscosity of the first optical clear adhesive layer 130 is less than 12 Pas, the first optical clear adhesive layer 130 is easily separated from the polarizing film 120, which makes air bubbles be generated at the interface between the first optical clear adhesive layer 130 and the polarizing film 120.

In some embodiments, the first optical clear adhesive layer 130 has a peeling force of at least 2.0 kgf at −51° C. or 96° C., and preferably 2.6 kgf. If the peeling force of the first optical clear adhesive layer 130 is less than 2.0 kgf, the first optical clear adhesive layer 130 is easily separated from the polarizing film 120, which makes air bubbles be generated at the interface between the first optical clear adhesive layer 130 and the polarizing film 120.

In some embodiments, the sealing adhesive layer 170 includes at least one of high temperature curing glue, organic silicon glue, polyurethane glue, or polysulfide glue.

In some embodiments, when tested by, for example, a CL-150 hardness meter, the hardness of the sealing adhesive layer 170 is 30E to 40E.

In some embodiments, the tensile strength of the sealing adhesive layer 170 is equal to or greater than 9 kg/cm$^2$.

In some embodiments, the elongation ratio of the sealing adhesive layer 170 is 150% to 250%.

In some embodiments, the dielectric constant of the first optical clear adhesive layer 130 at 100 khz is equal to or less than 3.0.

In some embodiments, the thickness of the first optical clear adhesive layer 130 is 10 μm to 250 μm.

According to the foregoing recitations of the embodiments of the disclosure, it can be seen that in the touch panel module of the present disclosure, by using the sealing adhesive layer to completely cover the sidewalls of the polarizing film, the first optical clear adhesive layer, the transparent touch layer, and the second optical clear adhesive layer on the same side between the display panel and the protective layer and fill the gap between the first optical clear adhesive layer and the display panel, air bubbles can be prevented from being generated at the interface between the polarizing film and the first optical clear adhesive layer during the bonding process. In this way, the touch panel module of the present disclosure can have a number of air bubbles with a size larger than 0.1 mm per square centimeter less than 1 after undergoing the temperature shock test with three cycles between −51° C. and 96° C. and dwell times of upper and lower limits of temperature being 30 minutes or after undergoing the temperature shock test with three cycles between −51° C. and 71° C. and dwell times of upper and lower limits of temperature being 4 hours.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A touch panel module, comprising:
   a display panel;
   a polarizing film disposed on the display panel;
   a first optical clear adhesive layer disposed on the polarizing film and extending outward from an edge of the polarizing film to form a gap with the display panel;
   a transparent touch layer disposed on the first optical clear adhesive layer;
   a second optical clear adhesive layer disposed on the transparent touch layer;
   a protective layer disposed on the transparent touch layer and forming an appearance surface of the touch panel module; and
   a sealing adhesive layer formed between the display panel and the protective layer, completely covering sidewalls respectively of the polarizing film, the first optical clear adhesive layer, the transparent touch layer, and the second optical clear adhesive layer on a same side, and filling the gap,
   wherein after undergoing a temperature shock test with three cycles between −51° C. and 96° C. and dwell times of upper and lower limits of temperature being 30 minutes or after undergoing a temperature shock test with three cycles between −51° C. and 71° C. and dwell times of upper and lower limits of temperature being 4 hours, a number of air bubbles with a size larger than 0.1 mm per square centimeter of the touch panel module is less than 1.

2. The touch panel module of claim 1, wherein a water vapor permeability of the sealing adhesive layer is in a range from 1.4 $g/m^2 \cdot 24$ h to 3 $g/m^2 \cdot 24$ h.

3. The touch panel module of claim 1, wherein a moisture content of the sealing adhesive layer is greater than a moisture content of the first optical clear adhesive layer by at least 0.05 wt %.

4. The touch panel module of claim 1, wherein a moisture content of the sealing adhesive layer is in a range from 0.5 wt % to 1.5 wt %.

5. The touch panel module of claim 1, wherein a water vapor permeability of the first optical clear adhesive layer is in a range from 80 $g/m^2 \cdot 24$ h to 100 $g/m^2 \cdot 24$ h, and a moisture content of the first optical clear adhesive layer is 0.45 wt %.

6. The touch panel module of claim 1, wherein a viscosity of the first optical clear adhesive layer at −51° C. or 96° C. is at least 12 Pas.

7. The touch panel module of claim 1, wherein the first optical clear adhesive layer has a peeling force of at least 2.0 kgf at −51° C. or 96° C.

8. The touch panel module of claim 1, wherein the sealing adhesive layer has an inner side surface and an outer side surface, the inner side surface is in contact with the sidewalls of the polarizing film, the first optical clear adhesive layer, the transparent touch layer, and the second optical clear adhesive layer, the outer side surface is connected to the display panel and the protective layer, and in a direction perpendicular to one of the sidewalls, a maximum distance between the inner side surface and the outer side surface is in a range from 4 mm to 6 mm.

9. The touch panel module of claim 8, wherein the inner side surface is completely and seamlessly in contact with the sidewalls of the polarizing film, the first optical clear adhesive layer, the transparent touch layer, and the second optical clear adhesive layer, the sealing adhesive layer further has an upper side surface and a lower side surface, the lower side surface is seamlessly in contact with a top surface of the display panel, and the upper side surface is seamlessly in contact with a bottom surface of the protective layer.

10. The touch panel module of claim 1, wherein the sealing adhesive layer comprises at least one of high temperature curing glue, organic silicon glue, polyurethane glue, or polysulfide glue.

* * * * *